United States Patent Office 3,037,242
Patented June 5, 1962

3,037,242
SHEET-METAL ARTICLES MANUFACTURING
Michel Eudier, Paris, France, assignor to La Metallurgie Francaise des Poudres, Paris, France, a company of France
Filed Sept. 14, 1959, Ser. No. 839,909
Claims priority, application France Sept. 19, 1958
1 Claim. (Cl. 18—9)

The invention relates to the manufacture of sheet-metal articles from metallic powders.

Machines and processes hitherto used have the disadvantage that it is very difficult, if not impossible in practice, to make both the dimensions and density of the manufactured sheet-metal articles constant. In fact, the width, thickness and density must all be kept constant; this is very difficult, and if one or two of these three parameters remain constant, the third varies.

In general, it is the width of the sheet-metal article which varies, and it is easier to keep the density and thickness constant. This leads to great loss of material, since about a third of the width very often has to be sacrificed in subsequently cutting off the edges of the sheet-metal article.

The present invention enables sheet-metal articles to be obtained which are not only constant in density and thickness, but which also do not vary appreciably in width. It may be put into use in simple fashion, without the need for expensive plant.

According to the present invention there is provided a machine comprising a hopper for distributing metallic powders intended to be sintered to form the sheet-metal articles, a moving belt positioned below the hopper to receive the metallic powders, at least one knife to even out the thickness of powder received by the belt, a support disposed below the belt to hold it up in the zone in which the powder thickness is evened out by the knife, and compression rollers for reducing the thickness of the powder which has been evened out.

The invention also comprises a process for manufacturing sheet-metal articles by means of the above-described machines, in which the metallic powders are deposited on a moving belt and are evened out in thickness, the layer of powder is slightly compressed, the sheet-metal article thus formed is passed into an oven wherein there is a reducing atmosphere and is then rolled in a reducing atmosphere.

Figure 1:
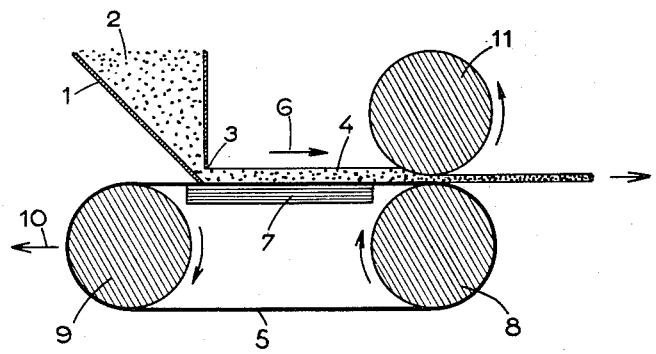
Figure 2:
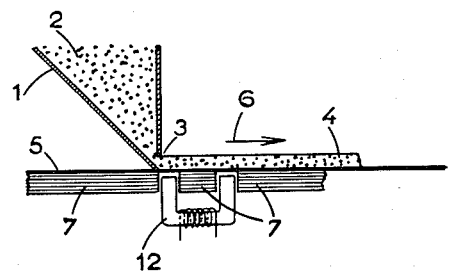

In order that the invention may be more fully understood, two preferred embodiments of the apparatus according to the invention will now be described, by way of example only, with reference to the accompanying drawing, in which:

FIGURES 1 and 2 are vertical longitudinal sections through the two embodiments.

Referring to FIGURE 1, the machine comprises a hopper 1 which receives the metallic powder 2. One of the lower edges 3 of the hopper forms a knife to even out the layer 4 of metallic powder on a moving belt 5 which moves below the hopper 1 in the direction of the arrow 6. A fixed support 7 is disposed below the belt in order to hold the latter up in the zone in which the powders 4 are evened out in thickness by the knife 3. The moving belt is driven by a roller 8, and tensioned by a roller 9, which is elastically pulled in the direction of the arrow 10 by a device of any type, for example comprising a spring or weight.

The belt 5 is thus kept perfectly plane below the knife 3, and the layer 4 of metallic powder is constant in density, thickness and width while the endless belt 5 is moving.

Upon leaving the evening-out zone, the thickness of powder layer 4 is rolled down between the roller 8 and a roller 11. The rollers 8 and 11 are spaced apart such a distance that the powder is preferably only slightly compressed. The resulting sheet-metal articles are deposited on another conveyor belt, for example, a stainless steel or refractory strip, and introduced into an oven wherein there is a reducing atmosphere. The powder acquires a certain degree of cohesion in the said oven, and is reduced. This operation is important, since it is generally impossible to obtain a sheet-metal article free of oxides if the powder, which is in the form of a cake after passing between the rollers 8 and 11, has not been reduced before rolling.

After remaining for a few minutes in the oven containing a reducing atmosphere, the solid hot cake of powder is passed between the rollers of a rolling mill, which is itself also in a reducing atmosphere. The speed of the rolling mill may, of course, be adjusted by any suitable means. After cooling, the sheet-metal article obtained may, if desired, be rerolled.

In the embodiment illustrated in FIGURE 1, the moving belt consists, for example, of a cold-rolled steel strip, and the powders which it receives may or may not be magnetic, since it is mechanically tensioned.

FIGURE 2 illustrates another embodiment which may be used, in particular, for non-magnetic powders.

The machine illustrated in very diagrammatic fashion in FIGURE 2 comprises a hopper 1 which receives powders 2 and is equipped with an evening-out knife 3 at its base. A cold-rolled steel belt 5 moves below the lower aperture of the hopper, and is supported by fixed supports 7 against which it is brought to bear by one or more electromagnets 12. The use of the electromagnets 12 eliminates the need for any mechanical tensioning means for the belt.

The invention is naturally not limited by the details of the methods of embodiment which have just been described, and the said details may be modified without departing from the scope of the invention.

I claim:

In a machine for manufacturing sheet-metal articles from metallic powders, a hopper for supplying non-magnetic metallic powders to be sintered in order to form the sheet-metal articles, a moving belt of magnetic material positioned below said hopper, a discharge orifice for said hopper discharging the non-magnetic metallic powders onto said belt, a knife edge on said hopper at said orifice to even out the thickness of the layer of powder received by said belt, a support disposed below said belt and below said orifice to hold up said belt in the zone in which the powder thickness is made uniform by said knife edge, at least one electromagnet disposed below said moving belt in the zone in which powder thickness is made uniform and compression rollers for reducing the thickness of the layer of powder of uniform thickness.

References Cited in the file of this patent

UNITED STATES PATENTS

| | | |
|---|---|---|
| 1,981,468 | Roseby | Nov. 20, 1934 |
| 2,134,366 | Hardy | Oct. 25, 1938 |
| 2,158,461 | Koehring et al. | May 16, 1939 |
| 2,341,732 | Marvin | Feb. 15, 1944 |
| 2,346,765 | Kratz | Apr. 18, 1944 |
| 2,430,285 | Ferris | Nov. 4, 1947 |
| 2,582,744 | Brennan | Jan. 15, 1952 |
| 2,742,185 | Landry | Apr. 17, 1956 |
| 2,877,823 | Van Antwerpen et al. | Mar. 17, 1959 |

FOREIGN PATENTS

| | | |
|---|---|---|
| 568,248 | Canada | Dec. 30, 1958 |